…

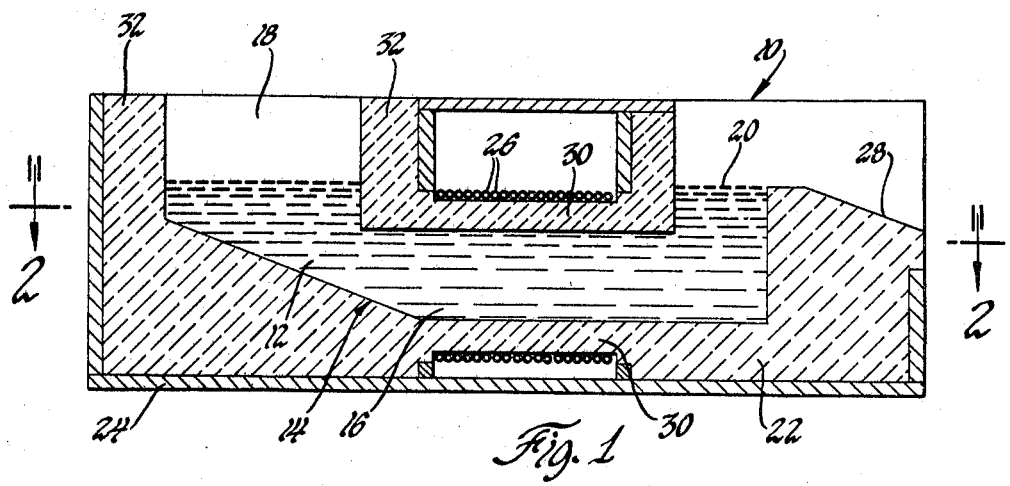
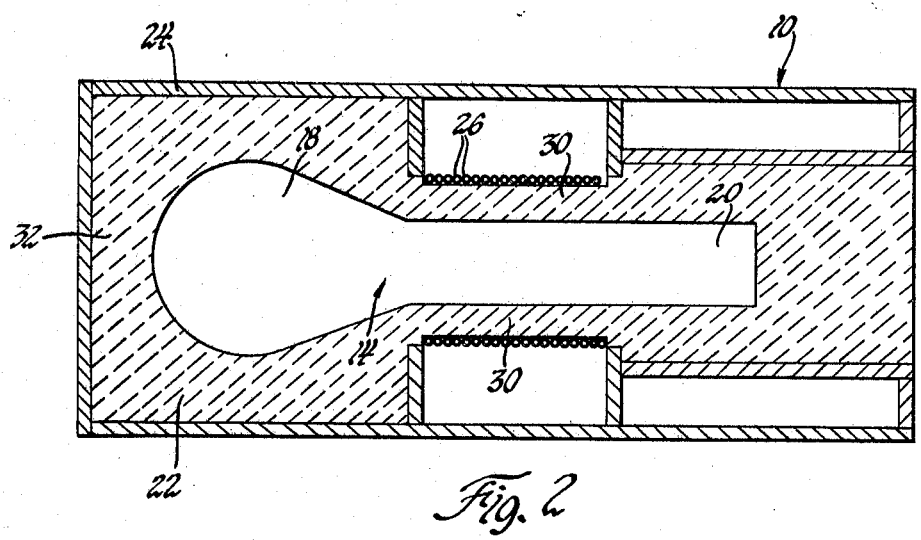

United States Patent Office 3,483,301
Patented Dec. 9, 1969

3,483,301
HORIZONTAL CORELESS INDUCTION FURNACE
William J. Duca, Warren, Ohio, assignor to General Motors Corporation, Detroit, Mich., a corporation of Delaware
Filed Dec. 7, 1966, Ser. No. 599,800
Int. Cl. H05b 5/00, 5/14; C03b 5/02
U.S. Cl. 13—26                                      6 Claims

ABSTRACT OF THE DISCLOSURE

A coreless induction melting or heating furnace and method of using is disclosed, the furnace having an open ended, horizontally disposed heating chamber around which an induction coil is wrapped and a vertically disposed reservoir at and above each end above each end of the heating chamber. In the operation of the furnace a head of molten metal is maintained in the reservoirs well above the level in the heating chamber so as to maintain the heating chamber full of metal and free of slag despite the stirring affect of the induction field.

---

This invention relates to an induction furnace for melting and heating metals. More particularly, it relates to a horizontal coreless induction furnace suitable for efficient, continuous operation.

Coreless induction furnaces have been used for some time as a means of melting and superheating metals in the preparation of alloy compositions and in providing molten metal for casting. They advantageously provide a relatively clean device for performing melting operations. These furnaces presently in use are typically formed of a refractory crucible or other container having a relatively deep vertical dimension, but relatively small horizontal dimensions. The induction heating coil is located about the vertically disposed vessel with its axis concentric with the axis of the container. When electrical energy is supplied to the induction coil, an alternating magnetic field is created which is magnetically coupled with the metal charge in the container whereby the metal is melted and heated to a predetermined temperature. Heat is generated by eddy currents created in the molten metal by the magnetic field. However, the magnetic field also exerts a force which tends to pinch the molten metal radially inwardly away from the induction coil and the wall of the container. This radial displacement of the fluid effects an axial displacement creating a crown or convex upper surface on the molten metal. In a vertically disposed furnace the path of the eddy currents tends to move any slag, which would normally float on the upper surface of the metal, down the crown toward the refractory wall. Moreover, if a void is created between the molten metal and the wall of the container due to the pinch effect slag is drawn further downwardly along the wall of the container chemically attacking and eroding the refractory liner. This factor of chemical attack of the refractory lining by slag, coupled with the relatively expensive energy source, has been a deterrent to the use of induction furnaces as the the primary choice for high volume melting operations particularly in the field of ferrous metallurgy. Furthermore, these furnaces are generally charged, the melting performed, and then the molten metal discharged in batches which reduces the efficiency of the operation.

It is an object of my invention to provide a coreless induction melting furnace having a horizontally disposed refractory lined heating section which is suitable for a continuous charging and tapping operation as in contrast to current batch operations. The induction heating coil is located concentrically about the heating section. In operation, the horizontal heating section is maintained full of molten metal so as to prevent slag from entering this portion of the furnace and chemically attacking the refractory lining. Moreover, my furnace is so constructed that a pressure head of molten metal is in communication with the metal in the melting section to counteract the pinching force of the magnetic field which is setablished when electrical energy is supplied to the induction coil.

It is a further object of my invention to provide a method of melting and/or heating metal in a horizontally disposed coreless induction furnace whereby metal charge may be added substantially continuously at one end of the furnace, which is adapted to receive the charge, and continuously displaced from the other end of the furnace which is adapted to discharge the molten metal.

In brief, these and other objects and advantages of my invention are accomplished by providing a coreless induction furnace wherein the passage or channel in which the metal is contained as it flows through the furnace is arranged in a substantially U-shaped path. Specifically, the passage has a horizontal base portion, which is the principal metal containing cavity of the furnace, and vertical end portions or wells, which are employed for charging and discharging metal. An induction coil is located concentrically about the horizontal base portion. The vertical end portions are of sufficient height so that in normal furnace operation the horizontal portion is completely filled with metal and moreover there is an appreciable head of molten metal in the vertical end portions. After an initial charge is added to the furnace for startup, additional metal may be continuously added to one of the vertical portions of the channel and molten metal of predetermined temperature displaced continuously from the other end portion. This is not intended to preclude the possibility of providing additional reservoir capacity in the vertical end portions so that the furnace may be intermittently tapped by tilting. The rate of addition of the metal to the furnace and the quantity of electrical energy supplied to the coil are proportioned so that the newly added metal is melted and/or superheated in the bath which is maintained within a predetermined temperature range. Because the metal charge is added to one of the vertically disposed well portions the slag resulting from the impurities added therewith is trapped and confined in this well. The head of molten metal maintains the horizontal channel full and free of voids into which air or slag might otherwise be drawn. This is accomplished because the metalostatic head counteracts the pinch effect of the magnetic field. In addition to eliminating voids in the horizontal portion of the furnace the crown effect is reduced and can even be eliminated at the surface of the metal in the vertical wells.

A more complete understanding of my invention will be gained from the detailed description thereof which follows herewith. Reference will be made to the attached set of drawings in which:

FIGURE 1 is a vertical section of my furnace showing the U-shaped passage through which the metal flows and is heated; and FIGURE 2 is a horizontal section of the furnace taken along line 2—2 of FIGURE 1.

Referring to both figures, 10 indicates generally the horizontally disposed coreless induction furnace of my invention. It may be suitably adapted for melting any metal or alloy, but is expected to be particularly useful in ferrous metallurgy. In vertical section as seen in FIGURE 1, molten metal 12 is contained in a substantially U-shaped passage 14. Passage 14 is comprised of a horizontal base portion 16 and vertical end portions or wells 18 and 20. Horizontal portion 16 constitutes the principal metal containing cavity of the furnace. Up to about half or more of the metal inventory of the furnace typically is held in portion 16. Wells 18 and 20 are employed principally for maintaining a suitable head of molten metal above horizontal portion 16 and for charging and discharging metal to and from the furnace. The walls of the melting channel or passage 14 are defined by a refractory lining 22. The refractory is supported on its outside surface by a suitable shell 24. Situated about the horizontal portion of the passage 16 is an induction heating coil 26. The induction coil consists of a suitable tubular electrical conductor. In operation alternating electric current flows through the walls of the conductor and cooling water is passed through the hollow passage. Means (not shown) are provided to connect a water supply to the coil as well as a source of electrical energy.

It will be noted that vertical wells 18 and 20 are of sufficient height so that a substantial head of metal may be maintained above the top of the horizontal passage 16. Tapping well 20 is provided with a lip 28 over which molten metal flows as it is displaced from the furnace. Charging well 18 is shown slightly enlarged so as to facilitate the continuous addition of a solid metal charge to the furnace and the removal of slag therefrom.

As indicated above, molten metal in a predetermined temperature range is tapped from the furnace by displacement. The furnace of my invention is particularly suitable for continuous operation in that a metal charge such as pig iron or scrap ferrous-based metal may be charged by conveyor or hopper means at well 18. The charge may be solid or liquid as desired. In an operation in which the subject furnace is not employed in combination with another furnace such as a cupola the charge will, of course, be solid. In the startup of the furnace molten metal may be added until a suitable level is reached and a solid charge made thereafter. Alternatively, a solid charge may be placed in the horizontal passage 16 and malted, additional metal then being charged until the furnace is full.

Once channel 14 has been filled with molten metal the rate of addition of metal charge and the application of electrical energy to the induction coil are proportioned so that the incoming metal is melted and/or heated and the temperature of the bath is maintained at a predetermined temperaure range preferably above the melting point of the alloy. Moreover, provision is made so that wells 18 and 20 contain a suitable head of liquid metal whereby the pinching force of the magnetic field is balanced so that no void is created within the horizontal passage 16 between the molten metal 12 and the relatively thin refractory walls 30 shielding the induction coil. Moreover, the liquid head in wells 18 and 20 must be sufficient so that the eddy currents established in the melt by the magnetic field do not sweep slag from well 18 against refractory lining 30 into the horizontal well 16. In the operation of my furnace all slag which is produced is trapped and maintained in well 18. The slag may be removed periodically before any erosion of refractory wall takes place. Of course, the thickness of the refractory wall in this region 32 is substantially greater than that at 30 and considerable erosion could be tolerated before any replacement of the lining would be required.

Thus, the metal charge receives heat from the molten metal in the furnace which in turn is heated by eddy currents established by the induction coil which is magnetically coupled to the molten metal. The stirring action of the eddy currents provides suitable mixing if a heterogeneous charge is made to the bath. Thus, additives such as carbon or ferrosilicon may be added at the charging well 18 and complete mixing accomplished before the metal is displaced at well 20. In an alternative embodiment, the furnace of the present invetnion may be intermittently tapped by tilting rather than more or less continuously tapped by displacement. In this case the capacity of vertical wells 18 and 20 may be substantially increased over that required for continuous tapping and mechanical means provided (not shown) for tilting the furnace so as to pour molten metal of a predetermined temperature from vertical well 20. The furnace may, of course, be tilted about the axis of the horizontal passage portion 16, about the discharge end, or about any suitable axis.

The rate at which a metal charge may be melted and/or heated is a function of the coil power input per unit circumferential area of the molten metal contained within the coil. This is commonly referred to as the power density. At the state of the induction melting art prior to my invention, the power density of furnace coils are intentionally limited in order to minimize "crowning" at the surface of the metal and to avoid the electromagnetic pinch effect. However, the furnace structure and method of melting of my invention overcomes this difficulty and permits a multiple increase in operable power density. This, of course, increases the melting capacity of a given furnace. It also reduces the ratio of volumetric capacity or heel to the melting rate, which is a measure of the efficiency of the furnace.

It has been determined that the metalostatic head required to counterbalance the electromagnetic pressure resulting from a given coil and power supply can be calculated from the following equations:

(1)
$$H = k_1 \left[\frac{NI}{L}\right]^2$$

where
H = pressure (inches of metal)
$k_1$ = constant
N = number of coil turns
I = coil current in amperes
L = coil length in inches (2)
$$H = k_2 \frac{PD}{\sqrt{f}}$$

where
$k_2$ = constant
PD = power density
f = frequency cycles per second

Sixty cycle per second induction coils are genrally employed on a production furnace. However, use of a higher frequency current (e.g. 180 c.p.s.) may be desirable, since, as seen in the second equation above, for the same metalostatic head the higher frequency allows use of higher power density.

In accordance with my invention a laboratory coreless induction furnace has been built and operated. It was suitable for continuously melting iron at a rate of 400 pounds per hour while simultaneously maintaining a tap temperature of about 2800° F. at a power input of 190 kilowatts. The furnace hearth consisted of a 6" diameter horizontal melting tunnel (16 in the drawing) surrounded annularly by 21½ turns of a 960 cycle per second coreless induction coil. The internal diameter of the coil was 10.5 inches and the axial length of the coil was 11.5 inches. The coil drew, in a typical run, about 250 amperes at 800 volts at slightly less than unit power factor. A vertical well was located at each end of the melting tunnel (equivalent to 18 and 20 in the drawing). A 7" head of molten iron was maintained above horizontal passage 16.

The tunnel and end wells were formed by ramming a high alumina grain refractory around wooden forms which were subsequently burned away. The refractory surface was coated with a high alumina cement prior to each run. Initial melt-down was accomplished effectively by either of two methods. In "cold starting" a charge of heavy solids placed in the coil zone was melted, followed by addition of solid charge material to the molten heel. In "hot starting" a full charge of molten metal was poured into the preheated furnace.

In either case, once the furnace was filled, and a uniform metal temperature of 2800° F. was reached, continuous melting was achieved by adding small increments of solid charge to the rear well so that metal in the front well would overflow into the furnace spout. In a specific case, the charge was a gray iron comprising by weight, 3.6% carbon, 2.4% silicon, 0.8% manganese, 0.10% phosphorus, 0.09% sulfur, and the balance iron. Additions were made at a rate equivalent to the temperature recovery rate of the metal in the furnace. At a power expenditure of 190 kw., a melting rate of 400 pounds per hour was achieved, using 0.8 pound charge increments added at seven second intervals. The 400 pounds/hour melting rate obtained in the 400 pound capacity furnace provided a desirably low heel/melting rate ratio of 1/1; i.e. the throughput rate of the furnace was equal to the amount of hot metal in inventory in the furnace.

In order to determine the rate at which charge additions are dispersed throughout the melt, tin additions were made to the tapping well of the furnace, and samples for chemistry analysis were collected at various time intervals from the charging well. Complete diffusion of a 0.25% tin addition required about 120 seconds, although about 90% of the addition had diffused from the front well to the rear well in the relatively short time span of 52 seconds.

An expenditure of 60 kw. or about 31% of maximum power, was used in holding the metal at 2800° F. with no melting occurring. Effective melting power increased with the total power drawn, so that at the maximum melting rate (400 pounds/hour at 192 kw.) about 67 kw. or 35% of the power input was available for melting and superheating. The low efficiency of 35% is typical of small laboratory furnaces, which exhibit losses in higher proportion to useful melting kilowatts than larger production units.

Having fully described a preferred embodiment of my invention, it will be recognized that other forms thereof will become apparent to one skilled in the art, however, the disclosure of the preferred embodiment is not intended to limit the scope of my invention beyond that recited in the following claims.

I claim:
1. A coreless induction furnace for heating or melting metal comprising
   a horizontally disposed heating chamber having two axially spaced openings therein,
   a first vertically disposed reservoir communicating with one opening in said heating chamber and extending upwardly therefrom,
   a second vertically disposed reservoir communicating with the other opening in said heating chamber and extending upwardly therefrom, one of said reservoirs being adapted to receive a charge of metal to be heated and the other reservoir being adapted to discharge molten metal whereby in the operation of said furnace molten metal flows therethrough in a generally U-shaped path, said reservoirs being of sufficient height to maintain a substantial head of molten metal above the level of metal in said heating chamber, said heating chamber being constructed so as to contain the major portion of said metal in said furnace,
   an induction heating coil wrapped around said horizontal heating chamber,
   and means for supplying electrical energy to said coil.

2. A coreless induction furnace as in claim 1 wherein said reservoirs are of height sufficint to maintain a head of molten metal above the level of metal in said heating chamber such that slag is not swept into said horizontal chamber by the stirring action of the alternating magnetic field established by said induction coil.

3. A coreless induction furnace as in claim 1 wherein one of said reservoirs is constructed to continuously receive a charge of metal and the other of said reservoirs is constructed to continuously discharge the molten metal which is displaced by the incoming metal.

4. A method of melting or heating metal in a coreless induction furnace having an open ended horizontally disposed heating chamber, two vertically disposed reservoirs in communication with the ends of said heating chamber and an induction heating coil wrapped around said horizontal heating chamber comprising
   introducing a charge of metal through one of said reservoirs,
   supplying electrical energy to said coil sufficient to heat said charge to a predetermined temperature above the melting point of said metal,
   and discharging molten metal at said predetermined temperature from the other of said reservoirs, the respective amounts of said metallic charge and discharge being controlled so as to maintain the level of molten metal in said reservoirs at a height substantially above the level of molten metal in said horizontal heating chamber whereby slag is not swept into said heating chamber by the stirring action of the induced magnetic field.

5. A method of heating metal as in claim 4 wherein the electrical energy is continuously supplied to said coil and the metal charge is continuously supplied to a said reservoir in a proportion such that the molten metal continuously discharge by displacement from said other reservoir is maintained at said predetermined temperature.

6. A method of heating metal as in claim 4 wherein metal charge is supplied to one of said reservoirs and molte metal is intermittently discharged by tilting from said other said reservoir.

References Cited

UNITED STATES PATENTS

| 2,286,024 | 6/1942 | Tama et al. | 13—26 |
| 2,540,744 | 2/1951 | Lillienberg | 13—26 X |
| 2,778,726 | 1/1957 | Winter et al. | 13—26 X |

BERNARD A. GILHEANY, Primary Examiner

H. B. GILSON, Assistant Examiner

U.S. Cl. X.R.

13—6, 29

PO-1050
(5/69)

UNITED STATES PATENT OFFICE
CERTIFICATE OF CORRECTION

Patent No. 3,483,301      Dated December 9, 1969

Inventor(s)      William J. Duca

It is certified that error appears in the above-identified patent and that said Letters Patent are hereby corrected as shown below:

Column 1, line 17, delete one occurrence of "above each end". Column 2, line 7, "setab-" should read -- estab- --. Column 3, line 36, "malted" should read -- melted --. Column 6, line 5, "sufficint" should read -- sufficient --; line 43, "molte" should read -- molten --.

SIGNED AND
SEALED
JUN 23 1970

(SEAL)
Attest:

Edward M. Fletcher, Jr.
Attesting Officer

WILLIAM E. SCHUYLER, JR.
Commissioner of Patents